United States Patent
Seidl

(10) Patent No.: US 9,821,752 B2
(45) Date of Patent: Nov. 21, 2017

(54) HYBRID INFLATOR COMPRISING A BURST CAP, BURST CAP, AIRBAG MODULE, VEHICLE SAFETY SYSTEM AND METHOD OF MANUFACTURING A BURST CAP

(71) Applicant: TRW Airbag Systems GmbH, Aschau am Inn (DE)

(72) Inventor: Lorenz Seidl, Rechtmehring (DE)

(73) Assignee: TRW Airbag Systems GmbH (DE)

( * ) Notice: Subject to any disclaimer, the term of this patent is extended or adjusted under 35 U.S.C. 154(b) by 0 days.

(21) Appl. No.: 14/792,647

(22) Filed: Jul. 7, 2015

(65) Prior Publication Data

US 2016/0016531 A1    Jan. 21, 2016

(30) Foreign Application Priority Data

Jul. 21, 2014   (DE) .................. 10 2014 010 617

(51) Int. Cl.
*B60R 21/264* (2006.01)
*F42B 3/12* (2006.01)
(Continued)

(52) U.S. Cl.
CPC .......... *B60R 21/264* (2013.01); *B60R 21/272* (2013.01); *B60R 21/274* (2013.01);
(Continued)

(58) Field of Classification Search
CPC .. F42B 3/04; F42B 3/124; F42B 3/125; F42B 3/127; B60R 21/264; B60R 21/272; B60R 21/276
(Continued)

(56) References Cited

U.S. PATENT DOCUMENTS 6,295,935 B1 * 10/2001 Swann .................. B60R 21/268
                                                    102/202.14
6,553,914 B2 *  4/2003 Hosey .................. B60R 21/272
                                                    102/202.14
(Continued)

FOREIGN PATENT DOCUMENTS

WO          0113484         2/2001

*Primary Examiner* — Stephen M Johnson
(74) *Attorney, Agent, or Firm* — Tarolli, Sundheim, Covell & Tummino LLP

(57) ABSTRACT

The invention relates to a hybrid inflator (10) including a burst cap (20) including a bottom (21) and a sleeve-like side wall (22), the bottom (21) and the side wall (22) delimiting an igniter compartment (23), and the burst cap (20) in the idle mode being pressurized on the outer peripheral side with compressed gas having a filling pressure (PF) which at a functional maximum temperature of the hybrid inflator (10) has a maximum filling pressure (PFmax), and wherein the burst cap (20) can be destroyed by an igniter compartment side bursting pressure in the case of operation. In accordance with the invention, a transitional portion (24) is formed from the side wall (22) of the burst cap (20) to the bottom (21) so that the igniter compartment side bursting pressure required to destroy the burst cap (20) is lower than the sum of the maximum filling pressure (PFmax) and the filling pressure (PF). The invention further relates to a burst cap, an airbag module, a vehicle safety system as well as a method of manufacturing a burst cap.

20 Claims, 8 Drawing Sheets

(51) Int. Cl.
   *B60R 21/272* (2006.01)
   *B60R 21/274* (2011.01)
   *B60R 21/26* (2011.01)

(52) U.S. Cl.
   CPC .... *F42B 3/125* (2013.01); *B60R 2021/26029* (2013.01); *B60R 2021/26076* (2013.01)

(58) Field of Classification Search
   USPC .............................. 102/202.7, 202.9, 202.14
   See application file for complete search history.

(56) References Cited

U.S. PATENT DOCUMENTS

| | | | |
|---|---|---|---|
| 7,726,686 B2* | 6/2010 | Warren | B60R 21/268 |
| | | | 102/531 |
| 7,845,278 B2* | 12/2010 | Brisighella, Jr. | B60R 21/26 |
| | | | 102/202.11 |
| 2004/0107856 A1* | 6/2004 | Hennings | F42B 3/127 |
| | | | 102/202.7 |
| 2006/0260498 A1* | 11/2006 | Hatomoto | F42B 3/103 |
| | | | 102/202.14 |

* cited by examiner

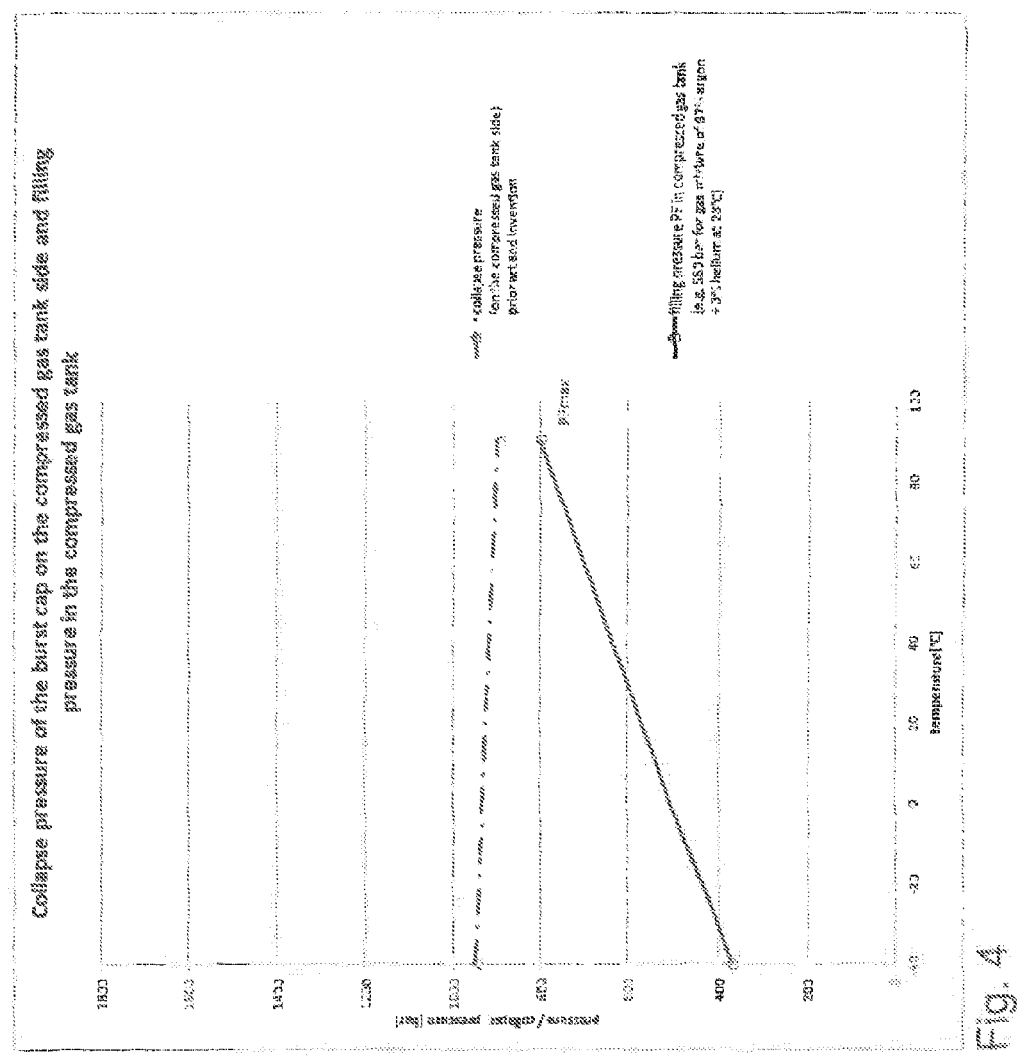

HYBRID INFLATOR COMPRISING A BURST CAP, BURST CAP, AIRBAG MODULE, VEHICLE SAFETY SYSTEM AND METHOD OF MANUFACTURING A BURST CAP

RELATED APPLICATION

This application claims priority from German Patent No. 10 2014 010 617.9, filed Jul. 21, 2014, the subject matter of which is incorporated herein by reference.

BACKGROUND OF THE INVENTION

The invention relates to a burst cap, especially for a hybrid inflater, comprising a bottom and a sleeve-like side wall delimiting an igniter compartment inside the burst cap, the burst cap being adapted to be pressurized with compressed gas on its outside in the idle mode and, in the case of operation, being adapted to be destroyed by a bursting pressure on the side of the igniter compartment. In addition, the invention relates to a hybrid inflator, an airbag module and a vehicle safety system. Moreover, the invention relates to a method of manufacturing a burst cap.

Occupant restraint systems for automotive vehicles usually include airbag modules comprising an airbag which in the case of crash is inflated so as to reduce the probability of body parts of a vehicle occupant colliding with a vehicle component. In order to inflate the airbag in the case of crash, for example hybrid inflators consisting of a compressed gas tank containing compressed gas and/or fluids and a pyrotechnical subassembly are provided, the pyrotechnical subassembly serving for triggering and/or heating the gas which is originally compressed and will escape in the case of operation. The compressed gas of such hybrid inflator can be closed off In a pressure-tight manner toward the pyrotechnical subassembly by a burst diaphragm or by a burst cap which in the idle mode thus can be or is pressurized on its outer peripheral side with the compressed gas stored in the compressed gas tank. The term "in the idle mode" hereby means that the hybrid inflator has not yet been activated, or in other words, that the burst cap is in an idle position in which no activating signal is provided as yet in response to which the burst cap is to be opened or burst.

WO 01/13484 A1, especially FIG. 8, illustrates an afore-described burst cap which is incorporated in a hybrid inflator. The cup-shaped burst cap includes a bottom which at its boundary area is transformed into a sleeve-like side wall and/or is integrally connected to the same by forming a radius. The bottom and the sleeve-like side wall delimit an igniter compartment in which an igniter is accommodated, wherein in the idle mode the burst cap can be or is pressurized with compressed gas on its outer peripheral side. In the case of operation, the burst cap can be destroyed by a bursting pressure on the igniter compartment side by activating the igniter. The burst cap has a continuously constant material thickness.

Such hybrid inflator thus comprises a compressed gas tank which may be filled, for example at room temperature, with a gas or gas mixture having a predetermined pressure, e.g. 580 bar, for example when manufacturing the hybrid inflator. Such pressure or filling pressure may increase, in the idle mode of the hybrid inflator, in the so called high-temperature case, by heating a vehicle interior to e.g. 90° C. by solar radiation to a maximum filling pressure of approx. 800 bar. When an airbag is triggered, the pyrotechnical subassembly opens the burst diaphragm closing the compressed gas tank or the burst cap closing the compressed gas tank so that the gas pre-compressed in the compressed gas tank inflates the airbag, wherein the pre-compressed gas may be nitrogen, argon, helium or oxygen and/or a mixture of two or more of said gases.

In the case of operation in which the burst cap is to be opened by activating an igniter, said igniter for this purpose has to build up a bursting pressure on the igniter compartment side which is far above the tilling pressure prevailing in the compressed gas tank. The igniter does not only have to build up the pressure required for the destruction of the burst cap, when considered isolated per se, but in addition it has to "counteract" the filling pressure prevailing in the compressed gas tank, i.e. overcome such counter-pressure so as to cause destruction of the burst cap at all, when it is incorporated in such hybrid inflator.

Since the pressure in such compressed gas tank may increase to approx. 800 bar as above described, extremely high bursting pressures have been necessary so far to open closing diaphragms and/or to open a burst cap. Accordingly, both a burst cap closing the gas tank and a possibly provided diaphragm are subjected to high pressure on the side of the compressed gas tank in the idle mode so that a burst cap is exposed, for example, to extreme bending and deformations and may support against or rest on other components of the hybrid inflator or the gas module thus possibly having a negative effect. Moreover and in addition the burst cap must be very stable by having appropriate material thickness so as to withstand the afore-described maximum filling pressure in the idle mode.

SUMMARY OF THE INVENTION

It is the object of the present invention to state a further developed burst cap to overcome the afore-mentioned drawbacks. In particular, a burst cap is to be described which, compared to the known prior art, is subjected to lower deformations and/or can be opened with a lower bursting pressure on the part of the igniter. It is a further object to develop a hybrid inflator so that a bursting or opening pressure of a burst cap can be reduced.

Moreover, it is the object of the invention to state an airbag module as well as a vehicle safety system comprising a further developed hybrid inflator and an improved burst cap. Also, it is the object of the present invention to state a method of manufacturing a burst cap.

In accordance with the invention, this object is achieved with respect to the burst cap by the subject matter of claim 1, with respect to the hybrid inflator by the subject matter of claim 7 or 9, with respect to the airbag module by the subject matter of claim 13, with respect to the vehicle safety system by the subject matter of claim 14 and with respect to the method of manufacturing a burst cap by the subject matter of claim 15.

Advantageous and expedient configurations of the hybrid inflator according to the invention and the burst cap according to the invention are described in the subclaims.

The invention is based on the idea to state a burst cap, especially for a hybrid inflator, comprising a bottom and a sleeve-like side wall, the bottom and the sleeve-like side wall delimiting an igniter compartment inside the burst cap and the burst cap in the idle mode being adapted to be pressurized on its outside with compressed gas and, in the case of operation, the burst cap being adapted to be destroyed by an igniter compartment side bursting pressure. According to the invention, a transitional portion from the side wall to the bottom is formed so that when the bottom is pressurized on the outside, a portion of the bottom on the igniter compartment side can rest on a portion of the side wall on the igniter compartment side.

Hence the invention is based on the idea to form the transition from the side wall to the bottom so that the bottom can be pressurized on the outside with compressed gas and the bottom need not be supported by other components. The bottom and the burst cap, resp., are formed to be quasi self-supporting in the idle mode. The transitional portion is preferably formed so that the bottom of the burst cap, especially an igniter-side portion thereof, can be supported merely toward its own vertical side wall, especially toward a portion on the igniter compartment side thereof. In other words, as due to the particular configuration of a transitional portion to the side wall arranged substantially perpendicularly to the bottom, in the idle mode the bottom can rest on the side wall, the burst cap is formed to be self-supporting, i.e. the burst cap need not be supported by a further component of the hybrid inflator when it is pressurized with compressed gas in the idle mode. Consequently, the burst cap is prevented from inadvertently and detrimentally resting on another component such as an igniter.

By the configuration according to the invention, especially by the self-supporting design of the burst cap, the burst cap according to the invention can be opened, on the one hand, with by far lower bursting pressures on the igniter side than this is the case with burst caps known from prior art.

Apart from that, the same burst cap according to the invention, on the other hand, may still have a comparably high collapse pressure on the part of a compressed gas tank of a hybrid inflator filled with compressed gas, as it is known from prior art burst caps incorporated in such hybrid inflator.

This fact will be described in detail further below.

Advantageously, the burst cap is formed in one piece, especially by re-forming, preferably by deep-drawing and/or bending and/or extrusion and/or embossing. Such configuration in one piece saves manufacturing costs as compared to a multi-part burst cap in which a bottom would have to be connected, e.g. welded, to a side wall.

The bottom or the side wall of the burst cap may comprise at least in portions a groove-shaped indentation having a groove bottom, the indentation preferably being provided on the outer peripheral side or substantially in parallel to a longitudinal axis of the burst cap. The groove-shaped indentation may be a groove-shaped recess or embossing. Preferably the groove-shaped indentation or embossing or recess is formed on the surface of the bottom facing away from the igniter compartment, but it may as well be located on a surface of the side wall facing away from the igniter compartment, advantageously in the area of the transitional portion. The groove bottom is the deepest point or the deepest surface portion of the indentation/recess/embossing. In other words, the groove bottom of the indentation is the point closest to the opposed bottom surface or bottom side or side wall and, resp., the closest surface portion. The indentation can be for example circular and/or semi-circular and/or cross-shaped and/or double C-shaped and/or I-shaped and/or wave-shaped in the bottom of the burst cap. Furthermore the indentation in the side wall can equally be circular and/or semi-circular.

In the transitional portion at least in portions a surface of the side wall on the igniter compartment side may have a curved shape, especially convex shape, preferably such that between the portion of the bottom on the igniter compartment side and the portion of the side wall on the igniter compartment side a fold having a tip is formed.

In other words, the transitional portion inside the burst cap can have a fold from the bottom to the side wall at least in portions, wherein the fold comprises a tip. The tip is the deepest point of the fold. Preferably the deepest point of the fold or, resp., the tip is formed in direct vicinity of the bottom of the burst cap. The tip can also define the transition point from the side wall to the bottom, especially from the area of the side wall on the igniter compartment side to the portion of the bottom on the igniter compartment side. The fold can be formed in the full inner periphery between the portion of the bottom on the igniter compartment side and the area of the side wall on the igniter compartment side.

It is imaginable that the portion of the bottom on the igniter compartment side and the especially convexly extending surface of the side wall on the igniter compartment side form the boundary faces of the fold. Accordingly, the curved, especially convex, shape of the surface of the side wall on the igniter compartment side can be delimited by the portion of the bottom on the igniter compartment side. In other words, the curved, especially convex, shape of the surface on the igniter compartment side ends at a boundary portion of the igniter compartment side portion of the bottom. If the burst cap is formed in one piece, the curved, especially convex shape of the surface on the igniter compartment side may be transformed into a boundary portion of the igniter compartment side portion of the bottom. The shape of the fold in the transitional portion of the burst cap may also be referred to be gusset-shaped or gusset-like.

Starting from the tip, a weakened zone to the closest surface portion of the burst cap on the outer peripheral side may be formed. The weakened zone of the burst cap is the area or portion defining and having, resp., the smallest wall thickness or burst cap thickness and being destroyed or bursting when an igniter compartment side bursting pressure is applied. In other words, in the weakened zone the area of the burst cap ruptures when the bursting pressure is applied.

The surface portion on the outer peripheral side which is closest to the tip can be a surface of the side wall on the outer peripheral side and/or the groove bottom. Accordingly, the weakened zone can be formed starting from the tip to a closest surface portion or surface point on the outer peripheral side, wherein the closest surface portion on the outer peripheral side can be a closest surface of the side wall on the outer peripheral side and/or a closest groove base of the bottom or the side wall, the weakened zone being adapted to be circumferential in an embodiment of the invention, i.e. the weakened zone can be formed at the full inner periphery on the igniter compartment side.

The transitional portion can have a bead-like inward shaping or outward shaping at least in portions, the inward and/or outward shaping reinforcing the transitional portion so that in the idle mode the bottom rests on the side wall and no additional support against other components or elements of the hybrid inflator is required.

Moreover, it is possible that the wall thickness of the burst cap in the transitional portion is smaller than in the igniter compartment side portion of the bottom and/or in the igniter compartment side area of the side wall. Hence the tip can describe or define the area of the smallest wall thickness of the burst cap.

The hybrid inflator according to the invention comprises a burst cap having a bottom and a sleeve-like side wall, the bottom and the side wall delimiting an igniter compartment. In the idle mode the burst cap is pressurized with compressed gas at a filling pressure which has a maximum filling pressure at a functional maximum temperature of the hybrid inflator. In the case of operation, the burst cap can be destroyed by a bursting pressure on the igniter compartment side.

In accordance with the invention, a transitional portion is formed from the side wall of the burst cap to the bottom so that the bursting pressure on the igniter compartment side required to destroy the burst cap is lower than the sum of the maximum filling pressure and the filling pressure.

Accordingly, a burst cap includes at least a bottom and a sleeve-like side wall, the interior of the burst cap serving as igniter compartment, wherein the outer surface of the burst cap in the idle mode is pressurized with compressed gas preferably provided in a compressed gas tank. The case of operation describes the trigger case, i.e. the case in which the compressed gas provided in a compressed gas tank is intended to inflate and, resp., inflates an airbag and consequently the burst cap has to be destroyed by a bursting pressure on the igniter compartment side.

The invention is thus based on the idea to form a transitional portion from the side wall of the burst cap to the bottom so that a bursting pressure on the igniter compartment side necessary to destroy the burst cap is lower than the sum of the maximum filling pressure and the filling pressure.

The sum of the maximum filling pressure and the filling pressure constitutes a calculable auxiliary variable as will be described hereinafter. The filling pressure is the temperature-dependent pressure in the compressed gas tank which, due to the different possible operation temperatures of a hybrid inflator can adjust in the idle mode in a vehicle. For example, a vehicle in which the hybrid inflator is incorporated is exposed to a functional temperature range of from usually minus 40 degrees Celsius to plus 90 degrees Celsius. Accordingly, the filling pressure in the compressed gas tank continuously increases at a temperature of $-40°$ C. to $+90°$ C. until it has reached its maximum filling pressure in the idle mode at $+90°$ C., viz. the functional maximum temperature of the hybrid inflator. The afore-mentioned calculable variable "sum of maximum filling pressure and filling pressure" thus can be Illustrated or understood as the (temperature-dependent) filling pressure increased by the level of the maximum possible filling pressure.

In addition, the hybrid inflator according to the invention can be configured so that the burst cap is connected, especially welded, to an igniter carrier so that a pyrotechnical igniter protrudes into the igniter compartment of the burst cap and the burst cap protrudes into the interior of a compressed gas tank. For connecting and/or welding the burst cap to an igniter carrier the burst cap may include a radially projecting collar, the collar being preferably formed at the end, especially the vertical end, of the side wall facing away from the bottom of the burst cap.

In the case of operation, i.e. when igniting the hybrid inflator, the igniter compartment is fluid-communicated or adapted to be fluid-communicated with the interior of the compressed gas tank. Due to the destruction or bursting of the burst cap, the compressed gas or pre-compressed gas present in the compressed gas tank can flow into the airbag by a shock wave triggered by the destruction of the burst cap passing through the compressed gas tank so as to open a further burst diaphragm closing the compressed gas tank so that the airbag is inflated.

As regards an airbag module, the object is achieved by the features of claim 13. Such airbag module according to the invention may comprise a burst cap according to the invention and/or a hybrid inflator according to the invention.

As regards a vehicle safety system, the object is achieved by the features of claim 14. Hence a vehicle safety system includes a burst cap according to the invention and/or a hybrid inflator according to the invention and/or an airbag module according to the invention. Similar advantages are resulting as they have been explained already in connection with the burst cap according to the invention and/or with the hybrid inflator according to the invention.

As regards a method of manufacturing a burst cap, especially a burst cap according to the invention, the object is achieved by the features of claim 15. Accordingly, a burst cap blank is provided with a fold during an upsetting and/or inward shaping and/or necking process, especially by reforming, preferably by deep-drawing and/or bending and/or extrusion and/or embossing, and/or with a fold having a tip between the igniter compartment side portion of the bottom and the igniter compartment side area of the side wall, it is imaginable to configure the fold including the tip over the full periphery and/or over the full inner periphery. Also an embodiment or formation of the fold in some areas is imaginable.

Furthermore, it is imaginable that the burst cap according to the invention is manufactured in two parts, i.e. that a bottom element is connected to a side wall element.

Within the scope of the method according to the invention the burst cap blank may be provided to be equipped with e bead-like inward and/or outward shaping, the bead-like inward and/or outward shaping being formed in the transitional portion from the side wall of the burst cap toward the bottom, preferably on the outer peripheral side.

BRIEF DESCRIPTION OF THE DRAWINGS

Hereinafter the invention will be illustrated in detail by way of embodiments with reference to the enclosed schematic figures, in which:

FIG. 4 shows a diagram for e collapse pressure on the compressed gas tank side of a burst cap according to prior art and according to the Invention and for a gas filling pressure in the compressed gas tank;

DESCRIPTION

Figure 1A:
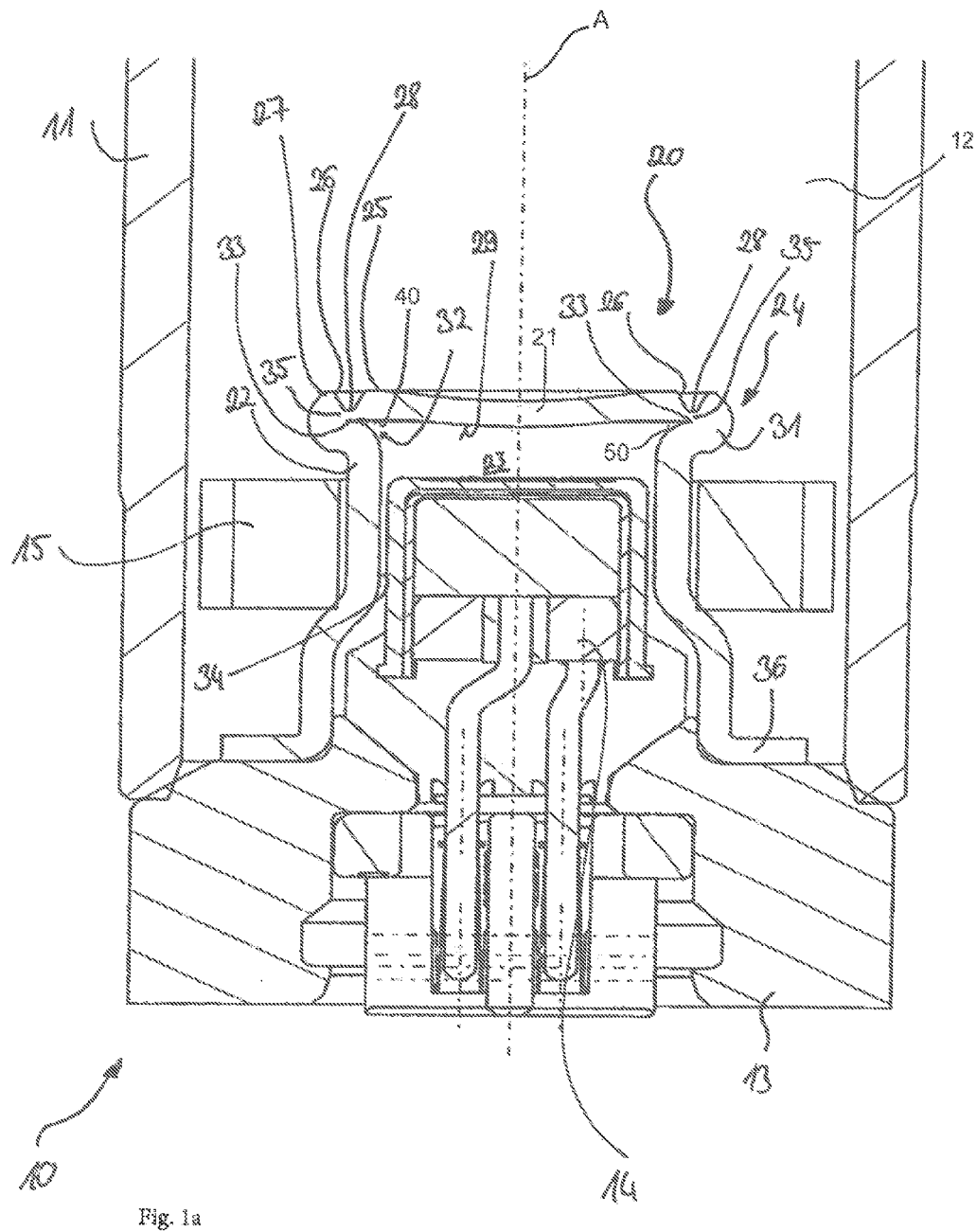
FIG. 1a shows a sectional view of an igniter-side partial area of a hybrid inflator according to the invention comprising a burst cap according to the invention without pressurization of the burst cap with compressed gas in accordance with a first embodiment.

Hereinafter for equal and equally acting parts the same reference numerals are used. In FIG. 1a an igniter-side partial area of a hybrid inflator 10 according to the invention including a burst cap 20 is illustrated. The hybrid inflator 10 includes a compressed gas tank 11 having an interior 12. For reasons of clarity, a complete representation of the compressed gas tank 11, i.e. a closure of the compressed gas tank 11 pressure-tight toward the top, was renounced.

In FIG. 1a the interior 12 is unpressurized; i.e. there is not yet provided any pre-compressed gas in the interior 12 and merely the atmospheric ambient pressure is acting.

Moreover an igniter carrier 13 as well as an igniter 14 is shown. The burst cap 20 is tightly connected, especially welded, to the igniter carrier so as to ensure tightness for a compressed gas to be filled into the interior 12 of the compressed gas tank 11. Moreover, an easily compressible packing ring 15 arranged at the radial periphery of the burst cap is shown which acts merely as volume compensation for a fuel filling not shown here, as it may be provided in the form of known pressed molds.

The burst cap 20 comprises a bottom 21 and a sleeve-like side wall 22. The bottom 21 and the side wall 22 delimit a burst cap interior and, resp., an igniter compartment 23.

FIG. 1a represents the idle mode of the hybrid inflator 10 in which no signal for activating the hybrid inflator is provided as yet.

As already described, in FIG. 1a the burst cap 20 is not yet pressurized with compressed gas on its outside, viz. on the part of the interior 12 of the compressed gas tank 11. This is also evident, inter alia, in FIG. 1a from the fact that the bottom 21 of the burst cap 20 is in an almost horizontal position, wherein in its central area it is only very slightly biased or pre-formed in the direction of the igniter 14. On the other hand, in FIG. 1b the bottom 21 of the burst cap 20 is clearly curved in the direction of the igniter 14, as will be described further below, because in FIG. 1b the burst cap is pressurized with pre-compressed gas on its outside.

In FIG. 1a the bottom 21 of the burst cap 20 includes a groove-shaped indentation or embossing 26 on its outer periphery, viz. on the outer surface 25. The groove-shaped indentation 26 is formed in the direction of the boundary area 27 of the bottom 21 over the full periphery, i.e. in circular shape, according to FIG. 1a. The groove bottom 28 of the groove-shaped indentation 26 constitutes the surface portion of the outer face 25 of the bottom 21 which is closest regarding the opposed inner face 29 of the bottom 21.

The transitional portion 24 from the bottom 21 to the side wall 22 includes a fold 32 at least in portions so that the bottom 21 in the shown idle mode is supported on the especially vertically arranged side wall 22 and the burst cap 20 is formed to be self-supporting.

There is equally shown a bead-like outward shaping 31 in the transitional portion 24, i.e. the boundary area 27 of the bottom 21 is reinforced on its outer peripheral side in the transitional portion 24 toward the side wall 22. In the transitional portion 24 of the burst cap 20 on the igniter compartment side the fold 32 which is tapered and has a tip 33 is formed at least in portions in the side wall 22. The tip 33 forms the deepest point of the fold 32 in the side wall 22 and, resp., in the igniter compartment side surface 34 of the side wall 22. The fold 32 as well as the tip 33 is formed over the full inner periphery, i.e. over the entire periphery of the igniter compartment side surface 34 of the side wall 22.

The fold 32 is formed by a curved shape, viz. a convex shape, of the igniter-side surface 34 of the side wall 22. The fold 32 and, resp., the shape of the fold 32 can also be referred to as gusset-shaped. According to the embodiment 1a, the tip 33 is formed on the vertical extension of the groove bottom 28. That is to say, the vertical line through the groove bottom 28 extends perpendicularly to the tip 33 and intersects the same. The fold 32 is delimited and, resp., formed by the convexly extending igniter-side surface 34 of the side wall 22 and the inner face 29, especially the peripheral boundary area of the inner face 29, of the bottom 21.

In other words, the fold 32 including the tip 33 is formed between an igniter compartment side portion 40 of the bottom 21 and an igniter compartment side area 50 of the side wall 22. The portion 40 of the bottom 21 on the igniter compartment side and the area 50 of the side wall 22 on the igniter compartment side are adjacent to each other in the tip 33 and, resp., contact each other there.

Starting from the tip 33, a weakened zone 35 is formed to a closest surface portion of the burst cap 20 on the outer peripheral side. The closest surface portion on the outer peripheral side is formed by the groove bottom 28 of the bottom 21 according to the illustrated embodiment. In other words, the weakened zone 35 is the area of the burst cap 20 having the smallest component thickness or wall thickness. If in the igniter compartment 23 a bursting pressure is generated, the weakened zone 35 is destroyed and, resp., the weakened zone 35 bursts so that the igniter compartment 23 is or can be fluid-communicated with the interior 12 of the compressed gas tank 11. Accordingly, the bottom 21 is torn off the sleeve-like side wall 22 due to the weakened zone 35 formed so that the burst cap 20 is destroyed especially along the weakened zone 35 and a fluid communication is established between the igniter compartment 23 and the interior 12.

The burst cap 20 further includes a radially projecting collar 36 serving for gaslight connection or for gaslight welding of the burst cap 20 to the igniter carrier 13. In the case of operation, i.e. if a signal for activating the hybrid inflator is provided, the igniter 14 must generate a bursting pressure so as to open the burst cap 20 from outside. In this context, "outside" means the igniter side or the igniter compartment 23. Since the bottom 21 of the burst cap 20 in the idle mode is pressurized with high internal pressure, i.e. with high pressure of the compressed gas prevailing in the interior 12, the bottom 21 can bear on the substantially vertically formed side wall 22. It is not necessary that it bears on the igniter 14 or on further elements of the hybrid inflator 10 in this case. Accordingly, the burst cap 20 is configured to be self-supporting.

Figure 1B:
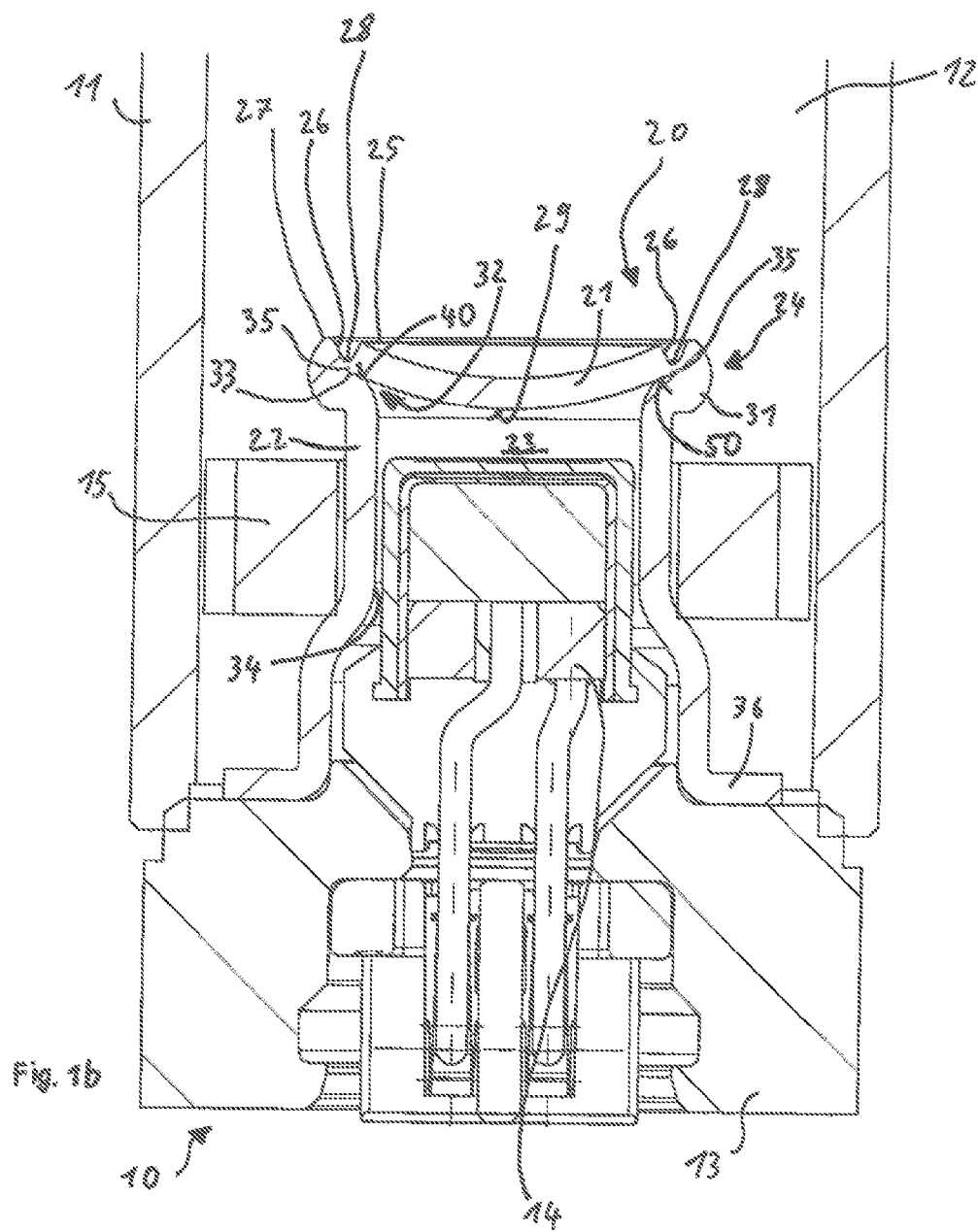
FIG. 1b shows a sectional view of an igniter-side partial area of a hybrid inflator according to the invention comprising a burst cap according to the invention with pressurization of the burst cap with compressed gas in accordance with the first embodiment.

In FIG. 1b, just like in FIG. 1a, an igniter-side portion of a hybrid Inflator 10 according to the invention including a burst cap 20 according to the invention is shown, wherein in this case the burst cap 20 is pressurized with compressed gas on its outside, i.e. on the part of the interior 12 of the compressed gas tank 11. In other words, FIG. 1b represents the portion of a hybrid inflator according to the invention shown in FIG. 1a, but with pressurization in the compressed gas tank 11 as it is the case in a hybrid inflator 10 completely mounted according to the invention. As regards corresponding reference numerals and the meaning thereof, the explanations as regards the embodiment according to FIG. 1a are referred to.

As described already in the foregoing, in FIG. 1b the bottom 21 of the burst cap 20 is definitely curved in the direction of the igniter 14, which is caused by pressurization in the compressed gas tank 11.

In FIG. 1b the compressed gas tank 11 is filled with compressed gas whi0ch may be a pre-compressed gas such as e.g. nitrogen, argon, helium or oxygen, or a mixture of two or more of said gases. The compressed gas tank 11 may be pressurized with a pressure of 580 bar at room temperature, wherein said pressure can increase to approx. 800 bar in the event of high temperature, viz. in a vehicle heated by the sun in which the hybrid inflator is installed, of up to 90° C. In the case of this functional maximum temperature of 90° C. of the hybrid inflator, thus a maximum filling pressure of 800 bar is reached in the idle mode of the hybrid inflator.

In FIG. 1b the outside of the burst cap 20, especially the bottom 21 of the burst cap 20, is pressurized in the idle mode with the high pressure of the compressed gas prevailing in the interior 12, which causes the bottom 21 to curve toward the igniter compartment 23, as the igniter compartment 23 is still unpressurized or merely atmospheric pressure is prevailing there, because the igniter has not yet been activated or ignited in the idle mode.

In this respect it is clearly visible from FIG. 1b that in the area of the fold 32 the igniter compartment side portion 40 of the bottom 21 can rest on the igniter compartment side area of the side wall 22. This support takes place at a position or in an area which is located radially inwardly relative to the groove bottom 28, i.e. in the direction of the burst disk center or the longitudinal axis A of the burst cap 20. It is not necessary in this case that the bottom rests on the igniter 14 and on further elements of the hybrid inflator 10. The burst cap 20 is formed to be quasi self-supporting.

Like FIG. 1a, FIG. 1b shows an idle mode of the hybrid inflator 10 in which no signal for activation of the hybrid inflator has been provided so far. In a case of operation not shown here the burst cap 20 can be destroyed by an igniter compartment side bursting pressure, i.e. acting in the igniter compartment 23.

Figure 2:
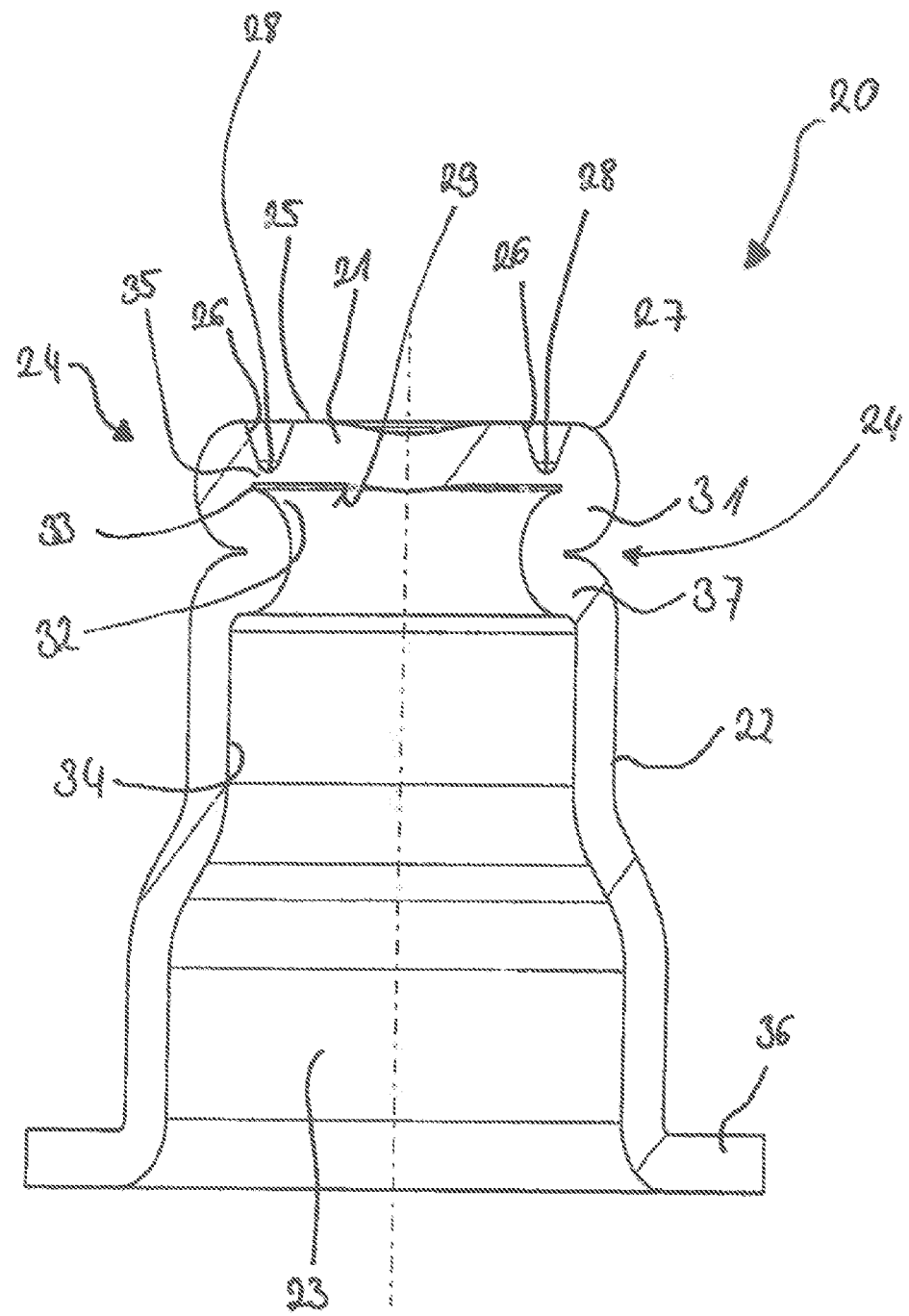
FIG. 2 shows a second embodiment of a burst cap according to the Invention.

FIG. 2 illustrates a further embodiment regarding a burst cap 20 according to the invention. As regards concurrent reference numerals and the meaning thereof, the explanations concerning the embodiments according to FIGS. 1a and 1b are referred to.

Initially also the burst cap 20 in FIG. 2 comprises a bottom 21 and a sleeve-like side wall 22. The igniter compartment 23 is equally shown. According to this embodiment, too, a transitional portion 24 is configured from the side wall 22 of the burst cap 20 toward the bottom 21.

On the external face 25 of the bottom 21 a groove-shaped indentation 26 having a groove bottom 28 is formed, the groove-shaped indentation 26 having a circular shape in the boundary area 27 of the bottom 21. The groove bottom 28 is the surface portion closest to the inner face 29 of the bottom 21. The transitional portion 24 comprises a fold 32 which is formed so that in the idle mode the bottom 21 rests on the substantially vertically formed side wall 22 and the burst cap 20 and, resp., the bottom 21 are self-supporting. In the transitional portion 24 of the burst cap 20 on the igniter compartment side the surface 34 of the side wall 22 on the igniter compartment side includes a fold 32 having a tip 33. The fold 32 is tapered toward the tip 33. The fold 32 is formed by a curved path, viz. a convex path, of the surface 34 of the side wall 22 on the igniter compartment side.

In the boundary area 27 of the bottom the burst cap 20 has a bead-like outward shaping 31 which is transformed into a bead-like inward shaping 37. Due to this double-beaded configuration of the transitional portion 24, the bottom 21 can withstand very high pressures of compressed gas acting on the outer peripheral side, as the bottom 21 rests vertically on the sleeve-like side wall 22 and, due to the bead-like outward shaping 31 and the bead-like inward shaping 37, a double-beaded transitional portion is formed which can be strongly compressed. Accordingly, also this shown burst cap 20 is self-supporting. In the shown embodiment the weakened zone 35 is equally formed starting from the tip 33 to the closest surface portion of the burst cap 20 on the outer peripheral side, i.e. the groove bottom 28 of the bottom 21. When bursting pressure is applied to the igniter compartment 23 and accordingly to the inner face 29 of the bottom 21, the weakened zone 35 between the tip 33 and the groove bottom 28 is consequently destroyed.

Figure 3A:
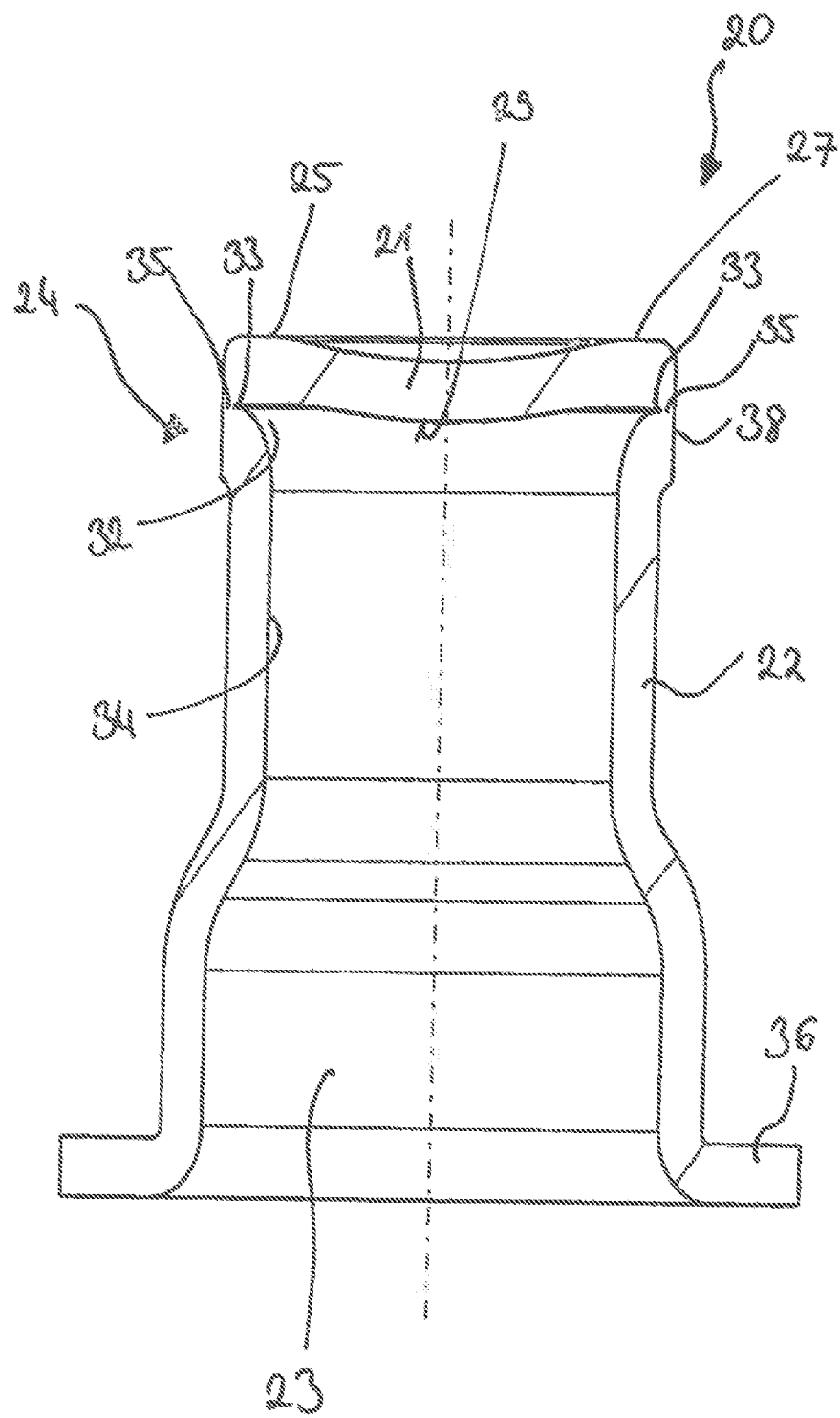
FIG. 3a shows a third embodiment of a burst cap according to the Invention.

FIG. 3a illustrates a third possible embodiment of a burst cap 20 according to the invention. As regards concurrent reference numerals and the meaning thereof, the explanations regarding the embodiments according to FIGS. 1a, 1b and 2 are referred to.

The igniter compartment side surface 34 of the side wall 22 has a curved shape, i.e. a convex shape, toward the bottom 21. The wall thickness of the side wall 23 decreases in the transitional portion 24 corresponding to the path of the igniter compartment side surface 34 of the side wall 22 toward the bottom 21. Accordingly, the side wall 22 includes in the area of the tip 33 the smallest wall thickness. Starting from the tip 33 a weakened zone 35 is formed toward the closest surface portion of the burst cap 20 on the outer peripheral side. The closest surface portion on the outer peripheral side is a face 38 of the side wall 22 on the outer peripheral side. When the igniter compartment 23 and, resp., the inner face 29 of the bottom 21 are pressurized, the bottom 21 is separated from the side wall 22, as the side wall 22 is broken or ruptured in horizontal extension of the tip 33 and the bottom 21 then can separate from the side wall 22.

In connection with the embodiment according to FIG. 3a, the configurations of bead-like outward shaping 31 or inward shaping 37 are renounced. Nevertheless, in the transitional portion 24 the bottom 21 rests on the sleeve-shaped side wall 22 formed perpendicularly to the bottom 21 so that the bottom 21 is merely slightly bent, when pressure of a compressed gas on the outer peripheral side is applied, and additional support against parts of the hybrid inflator 10 and/or the igniter 14 is not necessary.

Figure 3B:
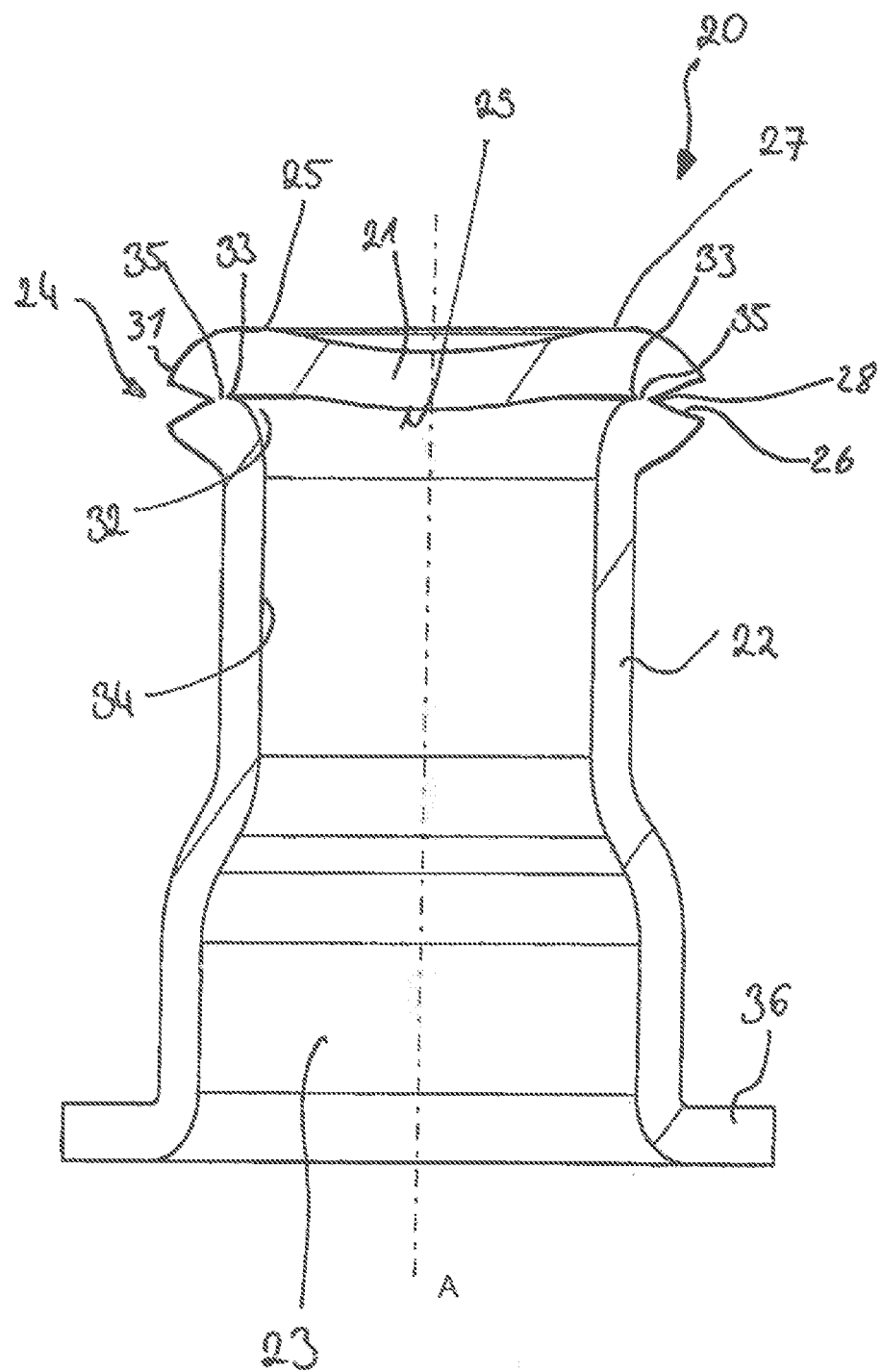
FIG. 3b shows a fourth embodiment of a burst cap according to the Invention.

FIG. 3b shows a fourth possible embodiment of a burst cap 20 according to the invention. As regards concurrent reference numerals and the meaning thereof, the explanations regarding the embodiments according to FIGS. 1a, 1b, 2 and 3a are referred to.

The fourth embodiment of FIG. 3b substantially corresponds to the afore-described third embodiment of FIG. 3a, however with the substantial difference of the embodiment of FIG. 3b including a groove-shaped indentation 26 having a groove bottom 28. The transitional portion 24 includes a bead-like outward shaping 31 in which the groove-shaped indentation 26 is arranged radially, substantially perpendicularly to the longitudinal axis A of the burst cap 20. The groove-shaped indentation 26 and especially the groove bottom 28 thereof are preferably positioned such that they are provided substantially level with the tip 33 of the fold 32 related to the longitudinal axis A of the burst cap 20.

In the embodiment of FIG. 3b, too, a weakened zone 35 is formed which extends starting from the tip 33 to the closest surface portion of the bead-like shaping 31 represented by the groove bottom 28.

In other words, the embodiment of FIG. 3b can also be understood to be a modification of the first embodiment of FIG. 1a to the effect that, according to FIG. 3b, the groove-shaped indentation 26 in FIG. 1a is arranged to be outwardly offset by approx. 90° C. vis-à-vis the position shown there, viz. radially outwardly along the bead-like outward shaping. In other words, the alignment of the groove-shaped indentation 26 shown in FIG. 1a is shifted, namely substantially in parallel to the longitudinal axis A of the burst cap 20, toward an alignment substantially perpendicularly to the longitudinal axis A of the burst cap 20, as illustrated in FIG. 3b.

Upon pressurization of the igniter compartment 23 and, resp., the inner face 29 of the bottom 21, the bottom 21 is separated from the side wall 22 as the side wall 22 is broken or ruptured in the horizontal extension of the tip 33 and the bottom 21 then can separate from the side wall 22.

FIG. 4 illustrates a diagram including a curve for a collapse pressure on the compressed gas tank side of a burst cap according to prior art and according to the invention and furthermore a curve for a tilling pressure PF in the compressed gas tank 11.

At the horizontal axis of the diagram a temperature scale from −40° C. to +90° C. corresponding to the common functional range of application of an inflator or hybrid inflator is marked. At the vertical axis a pressure scale from 0 bar to 1800 bar is marked.

The lower curve in FIG. 4 represents the filling pressure PF in the compressed gas tank which is resulting dependent on the temperature. In the present case, the compressed gas tank was filled with a gas mixture of 97% argon and 3% helium at a pressure of 580 bar and at a temperature of 23° C. (room temperature) so that the shown curve (characteristic) is resulting. At a maximum operation temperature of the hybrid inflator of +90° C. a maximum filling pressure PFmax of 800 bar is adjusted in the compressed gas tank.

The upper curve in FIG. 4 shows the collapse pressure or bursting pressure of a burst cap on the side of the compressed gas tank both of prior art and of the invention. The term "collapse pressure on the side of the compressed gas tank" in this case means the following: A burst cap mounted in a hybrid inflator as shown e.g. in FIG. 1b of the invention in the idle mode must of course withstand, as regards structural strength, the filling pressure PF in the compressed gas tank which pressurizes the burst cap on the outer peripheral side from the interior 12 of the compressed gas tank 11. In general, a burst cap will be designed regarding said strength so that there is always included a safety factor which takes relevant parameters such as component and pressure tolerances into account so that a burst cap cannot collapse in the idle mode.

Nevertheless, when designing a hybrid inflator it is checked at which pressure in the compressed gas tank a burst cap will structurally collapse. Such characteristic is now represented by the upper curve "collapse pressure (on the compressed gas tank side)" in FIG. 4. Substantially there is no difference between the collapse pressure of a prior ad burst cap and the collapse pressure of the burst cap 20 according to the invention, as the burst cap 20 according to the invention, if it is intended to replace a prior art burst cap and is to be exchanged for the latter, is supposed to imitate a quasi identical collapse pressure characteristic and is supposed not to collapse already at a lower filling pressure than a prior art burst cap. A prior art burst cap can be considered the burst cap known from the already mentioned document WO1/13484 A2, FIG. 8 there.

Figure 5:
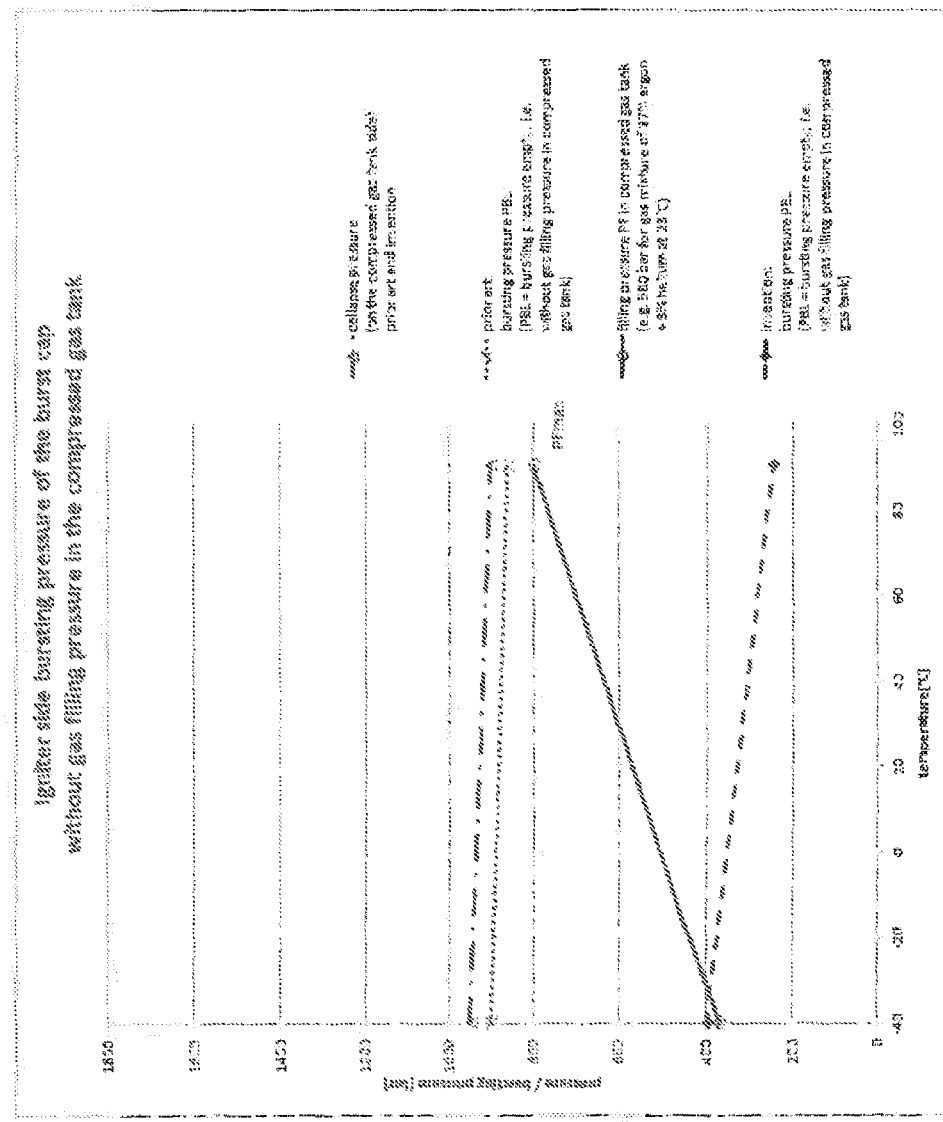
FIG. 5 shows a diagram for an igniter-side bursting pressure of a burst cap without gas filling in the compressed gas tank by comparison of the prior art and the invention.

FIG. 5 shows a diagram including curves for an igniter-side bursting pressure without gas filling in the compressed gas tank 11 by comparison of the prior art and the invention. The term "without gas filling in the compressed gas tank" means that in this case a state is considered in which the hybrid inflator is not (yet) filled with compressed gas as specified, as is illustrated in FIG. 1a for example. Hence in the idle mode on both sides of the burst cap 20, i.e. on the compressed gas tank side and on the igniter side, identical pressure levels are prevailing, such as the atmospheric ambient pressure. In other words, here only the igniter-side bursting pressure is to be considered which is merely required, considered isolated per se, for opening and, resp., destroying the burst cap 20.

As test rig for determining the igniter-side bursting pressure shown in FIG. 5 for example a device as represented in FIG. 1a can be established, namely having a wall of a compressed gas tank 11 that is open or "cut off" toward the top. For measuring the igniter-side bursting pressure then the igniter is activated (ignited) and the pressure formed in this way in the igniter compartment 23 is measured as the igniter-side bursting pressure required to open and, resp., destroy the burst cap.

In this way, on the one hand a burst cap known from prior art such as from the already mentioned document WO1/13484 A2, cf. there FIG. 8, can be used in an aforementioned test rig so as to determine the curve "prior ad: bursting pressure PBL" shown in FIG. 5.

On the other hand, the burst cap 20 according to the invention, as shown in FIG. 1a of the invention, can be used to obtain the curve "invention: bursting pressure PBL" shown in FIG. 5.

The abbreviation "PBL" in each case stands for "bursting pressure empty", which is equivalent to the afore-described term "without gas filling in the compressed gas tank".

As to the diagram in FIG. 5 in detail:

It is clearly visible there that these two bursting pressure characteristics "prior art: bursting pressure PBL" and "invention: bursting pressure PBL" are very far from each other; i.e. to a prior art burst cap a considerably higher bursting pressure, for example 900 bar at −40° C. and 860 bar at +90° C., has to be applied by the igniter than to the burst cap 20 according to the invention for which merely 400 bar at −40° C. and 250 bar at +90° C. are required for opening the burst cap 20.

In this way a substantial advantage of the invention, i.e. considerable reduction of the igniter-side bursting pressure, is clearly evident.

This advantage can be achieved in that with the burst cap 20 according to the invention the transitional portion 24 from the side wall 22 to the bottom 21 is formed so that when pressure is applied from outside to the bottom 21 the igniter compartment side portion 40 of the bottom 21 may rest on the igniter compartment side area 50 of the side wall 22.

For the rest, the fact that in both bursting pressure characteristics in FIG. 5 the respective bursting pressure slightly decreases with an increasing temperature is due to a general material softening or structural weakening of the respective burst cap with increasing temperature.

In addition to the afore-described two bursting pressure characteristics "prior art: bursting pressure PBL" and "invention: bursting pressure PBL", in the diagram of FIG. 5 the two curves "collapse pressure (on the compressed gas tank side)" and "filling pressure PF in the compressed gas tank" described already in FIG. 4 are illustrated.

When comparing the upper two curves "collapse pressure (on the compressed gas tank side)" and "prior art: bursting pressure PBL", the following two statements can be made:

Firstly, both curves are located at a very small distance from each other. This is not surprising as both curves represent collapse pressure characteristics for the same component, viz. the prior art burst cap, for the curve "prior art: bursting pressure PBL" represents nothing else but a collapse pressure curve. The difference merely consists in the fact that the curve "prior art: bursting pressure PBL" is defined by application of pressure on the part of the igniter, i.e. in the igniter compartment 23, whereas the curve "collapse pressure (on the compressed gas tank side)" is resulting from the application of pressure on the part of the compressed gas tank 11.

Secondly, these two curves are within the total common temperature range of application of a hybrid inflator (−40° C. to +90° C.) above the maximum filling pressure PFmax (800 bar) which can be reached at the maximum operation temperature of the hybrid inflator (here +90° C.).

Thus in the diagram of FIG. 5 the curve "prior art: bursting pressure PBL" with the benchmark of the maximum operation temperature (+90° C.) with a bursting pressure value of 860 bar is above the maximum filling pressure PFmax of 800 bar of the compressed gas tank by approximately 7.5%.

On the other hand, the curve "invention: bursting pressure PBL" in the entire temperature range of application (−40° C. to +90°0 C.) is far below the maximum filling pressure PFmax (800 bar); concretely speaking, with the aforementioned benchmark of the maximum operation temperature (+90° C.) the bursting pressure PBL of the burst cap according to the invention in that case merely is 250 bar, i.e. below the maximum filling pressure PFmax by approx. 68.75%.

From this consideration, too, the already afore-mentioned substantial advantage of the invention is visible, viz. considerable reduction of the igniter-side bursting pressure by the burst cap 20 according to the invention.

Part of the afore-described consideration can also foe formulated as follows with the aid of a formula representation:

The following is applicable to a prior ad burst cap:

$$PBL > PFmax.$$

On the other hand, the following is applicable to a burst cap according to the invention:

$$PBL < PFmax$$

wherein PBL is defined in each case as igniter-side bursting pressure of the burst cap with only atmospheric counter-pressure on the side opposed to the igniter compartment, i.e. without any gas filling pressure in the compressed gas tank.

PFmax is defined as maximum filling pressure which is resulting at the maximum operation temperature of the hybrid inflator in the idle mode.

Figure 6:
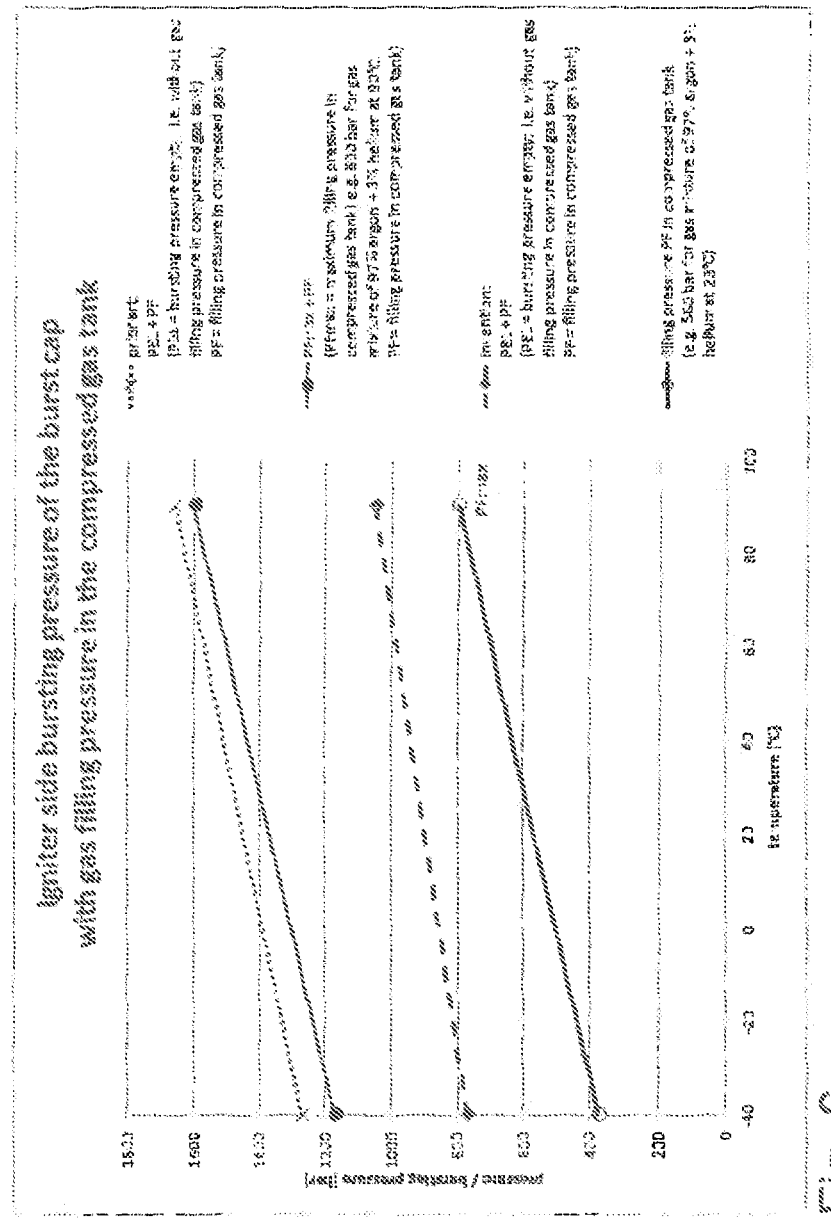
FIG. 6 shows a diagram for an igniter-side bursting pressure of a burst cap with gas filling in the compressed gas tank by comparison of the prior art and the invention.

FIG. 6 illustrates a diagram including curves for an igniter-side bursting pressure with gas filling in the compressed gas tank 11 by comparison of prior art and invention. In contrast to the afore-described FIG. 5, in this case the hybrid inflator is now filled with compressed gas as intended, as illustrated e.g. in FIG. 1b, i.e. mounted to be ready for use. A corresponding characteristic for the filling pressure PF in the compressed gas tank 11 as already shown in FIGS. 4 and 5 has been adopted for FIG. 6.

In FIG. 6 furthermore two curves "prior art: PBL+PF" and "invention: PBL+PF" are shown. These two curves are resulting, as already indicated by their formula designation, from addition of the curve of the igniter-side bursting pressure without any gas filling pressure in the compressed gas tank (cf. FIG. 5) to the curve of the corresponding filling pressure PF in the compressed gas tank.

In other words, the foregoing two curves of FIG. 6 develop from the two curves described in FIG. 5 "prior art: bursting pressure PBL" and "invention; bursting pressure PBL" by raising each of these two curves of FIG. 5 by the level of the curve "filling pressure PF"; that is to say, the respectively prevailing pressure value of the filling pressure PF in the compressed gas tank is added in each case to the pressure values of these two curves in FIG. 5.

In this way the real igniter-side bursting pressure is resulting for a prior art burst cap (curve "prior art: PBL+PF") and for the burst cap according to the invention (curve "invention: PBL+PF") as the filling pressure PF counteracts the igniter-side bursting pressure. For, as already described in the beginning, the igniter does not only have to build up the pressure required for destroying the burst cap, considered isolated per se, but it also has to "counteract" the filling pressure prevailing in the compressed gas tank, i.e. overcome such counter-pressure, so as to cause destruction of the burst cap at all, when it is mounted in such hybrid inflator.

A possible test rig concerning FIG. 6 for pressure measurement of the two curves "prior art: PBL+PF" and "invention: PBL+PF" can be realized by a device as illustrated e.g. in FIG. 1b, in this case with a wall of the compressed air tank 11 closed to the top, as a matter of course, so that the filling pressure PF appears in the compressed gas tank 11 (e.g. 580 bar at 23° C.). For measuring the igniter-side bursting pressure then the igniter 14 is activated and the resulting pressure in the igniter compartment 23 is measured.

With such test rig, i.e. a hybrid inflator filled with filling pressure to be ready for use, it has to be made plausible concerning the igniter-side bursting pressure that the activated igniter 14 in the igniter compartment 23 first has to generate a counter-pressure corresponding to the filling pressure PF prevailing in the compressed gas tank 11 so as to bring about a pressure balance on both sides of the burst cap 20 at all. Only a pressure proportion exceeding the level of the filling pressure PF in the igniter compartment 23 is adapted to provide for deformation and finally for opening and bursting of the burst cap.

Thus the igniter-side and igniter compartment side bursting pressures shown in FIG. 6 ("prior art: PBL+PF" and "invention: PBL+PF") are actually resulting pressures which are required for opening a burst cap in a hybrid inflator including a compressed gas tank filled with filling pressure.

In the diagram of FIG. 6, furthermore a curve "PFmax+PF" is shown. This is a calculable auxiliary variable or auxiliary curve which can be concluded from the diagram in FIG. 5 and is not a pressure actually measurable at a component or component space as will be explained hereinafter.

Since, as described already, the two curves "prior art: bursting pressure PBL" and "invention: bursting pressure PBL" from FIG. 5 are raised by the pressure level of the characteristic "filling pressure PF in the compressed gas tank" so as to arrive at the corresponding curves in FIG. 6 ("prior art: PBL+PF" and "invention: PBL+PF"), accordingly also the pressure value "PFmax" of FIG. 5 is raised by the pressure level of the characteristic "filling pressure PF in the compressed gas tank", which then results in the calculable auxiliary curve "PFmax+PF", viz, the sum of the maximum filling pressure PFmax and the filling pressure PF.

FIG. 6 clearly reveals that in a prior art burst cap the igniter compartment side bursting pressure required for destroying the burst cap (curve "prior art: PBL+PF") is above the curve "PFmax+PF" in the entire temperature range of application (−40° C. to +90° C.) of the hybrid inflator.

On the other hand, in this range the igniter compartment side bursting pressure required for destroying the burst cap 20 according to the invention (curve "invention: PBL+PF") is far below the curve "PFmax+PF".

In other words, it is evident from FIG. 6 that the igniter compartment side bursting pressure required for destroying the burst cap 20 according to the invention is lower than the sum of the maximum filling pressure PFmax and the filling pressure PF.

This relation can also be formulated, analogously to the foregoing, with the aid of the following formula representation:

The following is applicable to a prior art burst cap:

$$PBL+PF>PFmax+PF$$

whereas to a burst cap according to the invention the following is applicable:

$$PBL+PF<PFmax+PF.$$

LIST OF REFERENCE NUMERALS 10 hybrid inflator
11 compressed gas tank
12 interior of compressed gas tank
13 igniter carrier
14 igniter
15 packing ring
20 burst cap
21 bottom
22 sleeve-like side wall
23 igniter compartment
24 transitional portion
25 outer face of bottom
26 groove-shaped indentation
27 boundary area
28 groove bottom
29 inner face of bottom
31 bead-like outward shaping
32 fold
33 tip
34 igniter compartment side surface
35 weakened zone
36 collar
37 bead-like inward shaping
38 surface on the outer peripheral side
40 igniter compartment side portion of the bottom
50 igniter compartment side area of the side wall
A longitudinal axis of the burst cap
PF filling pressure in the compressed gas tank
PFmax maximum filling pressure in the compressed gas tank
PBL bursting pressure empty (without any gas filling pressure in the compressed gas tank)

The invention claimed is:

1. A burst cap, especially for a hybrid inflator, comprising a bottom (21) and a sleeve-like side wall (22) delimiting an igniter compartment (23) inside the burst cap (20), an outside of the burst cap (20) being adapted to be pressurized with compressed gas in an idle mode, and in a case of operation the burst cap (20) being adapted to be ruptured by an igniter compartment side bursting pressure,
wherein a transitional portion (24) is formed from the side wall (22) to the bottom (21), so that in a case of external pressure applied to the bottom (21), an igniter compartment side portion (40) of the bottom (21) abuts an igniter compartment side area (50) of the side wall (22).

2. The burst cap according to claim 1, wherein the burst cap (20) is formed in one piece, especially by reforming, preferably by deep-drawing and/or bending and/or extrusion and/or embossing.

3. The burst cap according to claim 1, wherein the bottom (21) or the side wall (22) comprises at least in portions a groove-shaped indentation (26) having a groove bottom (28) facing substantially in a direction parallel to a longitudinal axis (A) of the burst cap (20) or in a direction substantially perpendicular to the longitudinal axis (A).

4. The burst cap according to claim 1, wherein the side wall (22) includes an igniter compartment side surface (34) having a curved shape, especially a convex shape, preferably such that between the igniter compartment side portion (40) of the bottom (21) and the igniter compartment side area (50) of the side wall (22) a fold (32) including a tip (33) is formed.

5. The burst cap according to claim 4, wherein starting from the tip (33) a weakened zone (35) is formed to a closest outer peripheral side surface portion of the burst cap (20).

6. The burst cap according to claim 5, wherein the closest outer peripheral side surface portion constitutes an outer peripheral side surface (38) of the side wall (22) and/or the groove bottom (28).

7. A hybrid inflator (10) comprising the burst cap (20) according to claim 1.

8. The hybrid inflator according to claim 7, wherein a wall thickness of the burst cap (20) in the transitional portion (24) is smaller than in the igniter compartment side portion (40) of the bottom (21) and/or the igniter compartment side area (50) of the side wall (22).

9. The hybrid inflator (10) according to claim 7, wherein in the idle mode the burst cap (20) is pressurized on an outer peripheral side with compressed gas having a filling pressure (PF) which at a functional maximum temperature of the hybrid inflator (10) has a maximum filling pressure (PFmax), and wherein the igniter compartment side bursting pressure required for rupturing the burst cap (20) is lower than a sum of the maximum filling pressure (PFmax) and the filling pressure (PF).

10. The hybrid inflator according to claim 7, wherein the burst cap (20) is connected to an igniter carrier (13) so that an igniter (14) protrudes into the igniter compartment (23) of the burst cap (20) and the burst cap (20) protrudes into an interior (12) of a compressed gas tank (11).

11. The hybrid inflator according to claim 10, wherein the case of operation the igniter compartment (23) is or can be fluid-communicated with the interior (12) of the compressed gas tank (11).

12. An airbag module comprising the hybrid inflator (10) according to claim 7.

13. A vehicle safety system comprising the airbag module according to claim 12.

14. A vehicle safety system comprising the hybrid inflator (10) according to claim 7.

15. An airbag module comprising the burst cap (20) according to claim 1.

16. A vehicle safety system comprising the airbag module according to claim 15.

17. A vehicle safety system comprising the burst cap (20) according to claim 1.

18. A method of manufacturing a burst cap (20) according to claim 1, wherein a burst cap blank is provided in an upsetting and/or shaping and/or necking process, especially by reforming, preferably by deep-drawing and/or bending and/or extrusion and/or embossing, with a fold (32) and/or between the igniter compartment side portion (40) of the bottom (21) and the igniter compartment side area (50) of the side wall (22) with a fold (32) including a tip (33).

19. The burst cap according to claim 1, wherein the transitional portion is folded over itself such that the igniter compartment side portion abuts the igniter compartment side area when external pressure is applied to the bottom.

20. A burst cap for a hybrid inflator comprising:
a sleeve-like sidewall defining an igniter compartment inside the burst cap and having an igniter compartment side area exposed to the igniter compartment;
a bottom closing an axial end of the sidewall and having an igniter compartment side portion exposed to the igniter compartment; and
a transitional portion extending from the sidewall to the bottom and folded over itself such that the igniter compartment side area engages the igniter compartment side portion when external pressure from compressed gas is applied to an outside of the bottom when the inflator is in an idle mode, and wherein in an operation mode of the inflator the burst cap is adapted to be ruptured by an igniter compartment side bursting pressure.

* * * * *